United States Patent [19]
Rabe et al.

[11] Patent Number: 5,439,696
[45] Date of Patent: Aug. 8, 1995

[54] HIGH RATIO BAKING COMPOSITION

[75] Inventors: Gerald O. Rabe, Minnetonka; Thomas A. Meyers, Parkers Prairie, both of Minn.

[73] Assignee: The Pillsbury Company, Minneapolis, Minn.

[21] Appl. No.: 111,998

[22] Filed: Aug. 25, 1993

[51] Int. Cl.⁶ .......................... A21D 6/00; A21D 10/04
[52] U.S. Cl. ...................................... 426/555; 426/549; 426/551; 426/554
[58] Field of Search ................. 426/549, 554, 555, 551

[56] References Cited

U.S. PATENT DOCUMENTS

| | | | |
|---|---|---|---|
| 2,525,599 | 10/1950 | Gustavson | 426/554 |
| 3,428,461 | 2/1969 | Hatton | 426/555 |
| 3,974,298 | 8/1976 | Cauvain et al. | 426/553 |
| 4,294,864 | 10/1981 | Kulp et al. | 426/549 |
| 4,961,937 | 10/1990 | Rudel | 426/555 |
| 5,133,984 | 7/1992 | Murphy et al. | 426/653 |
| 5,296,250 | 3/1994 | Grisamare et al. | 426/555 |

FOREIGN PATENT DOCUMENTS

| | | |
|---|---|---|
| 0552006 | 7/1993 | European Pat. Off. |
| 1110771 | 4/1968 | United Kingdom. |
| 1499986 | 2/1978 | United Kingdom. |

OTHER PUBLICATIONS

Patent Abstracts of Japan vol. 12, No. 242 (C-150) 8 Jul. 1988 & JP,A,63 032 455 (Nitto Seifun KK) 12 Feb. 1988.
Bell et al., *J. Food Technol.*, "A Study of the Micro-Baking of Sponges and Cakes Using Cine and Television Microscopy", vol. 10, pp. 147–156 (1975).
Grider et al., *Food Microstructure*, "Evaluation of Selected Properties of Chlorinated Wheat Flours in a Lean Cake Formulation", vol. 2, pp. 153–160 (1983).
Russo et al., *J. Food Technol.*, "Heat Treatment of Flour as an Alternative to Chlorination", vol. 5, pp. 363–374 (1970).
Frazier et al., *Chemistry and Industry*, "Rheological Testing of High-Ratio Cake Flours", pp. 1008–1010 (1974).
Cauvain et al., *J. Sci. Food Agric.*, "High-Ratio Yellow Cake. The Starch Cake as a Model System for Response to Chlorine", vol. 26, pp. 1861–1868 (1975).
Hodge, *Baking Industries Journal*, "Alternatives to Chlorination for High Ratio Cake Flours", p. 14 (1975).
Gough et al., *CRC Critical Rev. in Food Science and Nutrition*, "The Role and Function of Chlorine in the Preparation of High-Ratio Cake Flour", pp. 91–113 (1978).

*Primary Examiner*—Jeannette Hunter
*Assistant Examiner*—Mary S. Mims
*Attorney, Agent, or Firm*—Merchant, Gould, Smith, Edell, Welter & Schmidt

[57] ABSTRACT

The invention is a high ratio baking composition as well as a method for producing high ratio baked products such as a cake which does not use chlorinated flour. The composition of the invention generally comprises heat treated flour, fiber and protein.

23 Claims, No Drawings

HIGH RATIO BAKING COMPOSITION

FIELD OF THE INVENTION

The invention generally relates to a high ratio baking composition. More specifically, the invention is directed to high ratio bakery mixes including a heat treated soft flour, a non-flour fiber and a water soluble heat denaturable protein useful for preparation of baked goods including cakes, muffins, and pancakes among other products.

BACKGROUND OF THE INVENTION

Treating flour with gaseous chlorine is well known in the baking industry. Flour treatment by chlorine has been found to be necessary for the production of baked products with the appropriate volume, tenderness and handling properties such as, for example, high quality cakes when using a high-ratio cake formulation. A high ratio cake formulation is one in which the weight ratio of sugar to flour in the cake is between 1:1 and 1:1.4. The difference in concentration of flour in the high ratio cakes as compared to sugar, places a greater strain on the flour during the creation of a cake structure.

If a high ratio cake is made from untreated flour, it appears to function quite normally in the earlier stages of batter development. Bell et al., J. Food Technol., 10, 147–156 (1975). The bubbles in the aerated batter expand, and the internal batter temperature rises at a similar rate to batter made from chlorine-treated flour. Grider et al., Food Microstructure, 2, 153–160 (1983). Later in the baking process, differences in the performance of batters made from untreated and chlorine-treated flours begin to appear. Batters formulated from untreated flour rise to a greater height than batters formulated from chlorine-treated flour. However, late in the bake the baked product formulated with the untreated batters falls more rapidly, and continues to fall as the baked good cools. Russo et al., J. Food Technol., 5, 363–374 (1970); Frazier et al., Chemy Ind., 1008–1010 (1974); Cauvain, J. Sci. Food Agric., 26, 1861–1868 (1975).

Examination of the cake crumb structures has revealed considerable differences in the sizes and appearances of the walls of the air cells in the crumb. Batters containing chlorine treated flours generally result in cakes having discrete, well-formed air cells with smooth cell walls, formed by starch granules embedded in a continuous protein matrix. Grider et al., Food Microstructure, 2, 153–160 (1983). In contrast, cakes made with untreated flours have irregular, deformed air cells with ragged cell walls, in which the protein matrix appears to be partly disrupted. It is believed that the smaller air cells are formed from the collapse of larger cells resulting in a new network of broken cells smaller in size than the original larger cells. Thus, it appears that the cell walls of a cake made from untreated flours are inherently weak and begin to deform and collapse under the weight of the cake when the gas pressure dissipates from within the cell structure.

Additionally, there is evidence that some gas cells remain intact at the end of the bake, and are subsequently crushed by the external pressure when the water vapor within them condenses. This phenomenon would account for the accelerated collapse of the cake structure observed immediately after leaving the oven.

Thus, high ratio cake mixes have employed chlorine-treated flour in their formulation. Although chlorine-treated flour has been used in Great Britain and the United States for many years, this use is not permitted in most of the Continental European countries. At the present time chlorine is permitted for use in cake flour, but its continued use as a flour additive is in question because of safety concerns with the occupational use of chlorine and the safety of consuming chlorinated organic compounds in general. Hodge, Baking Industries Journal, July, page 14 (1975). There have been many attempts to formulate an acceptable alternative to chlorinated flour high ratio cakes.

Gough et al., CRC Critical Rev. in Food Science and Nutrition, September, pp. 91–113 (1978), disclose a review of the known alternatives to the chlorination of flour including heat treating the flour. See Russo et al., British Patent No. 1,110,771 and Cauvain et al., J. Sci. Food Agric., 26, 1861–1868 (1975).

In Gough et al., a flour was heat treated at 200° C. (392° F.) for 6 minutes. Egg albumen was then added to increase the cake volume of the high ratio cake, but the organoleptic properties of the cake were undesirably changed. Thus, only a partial solution was provided.

These known alternatives to using chlorinated flour in a high ratio cake mix fail to perform as well as chlorinated flour high ratio cake mixes in terms of volume, density, fragility, and texture of the resulting cake. As a result, all high-ratio baking compositions produced commercially are made of and depend upon chlorinated flour. Thus, a substantial need exists for a high ratio baking composition in which the flour does not require treatment by chlorination.

SUMMARY OF THE INVENTION

The invention is directed to a high ratio baking composition without chlorinated flour equal in all respects to that made with chlorinated flour. In one aspect of the invention, there is provided a high ratio baking composition comprising a heat treated soft flour, sugar, an effective volume controlling amount of a non-flour fiber and an effective fragility controlling amount of a protein source.

In a preferred aspect, this invention relates to a high ratio cake composition comprising a heat treated soft wheat flour, sugar; about 0.25 to 3% by weight of a non-flour fiber and about 0.25 to 6% by weight of a water soluble, heat denaturable protein wherein the heat treated soft wheat flour is prepared by the step comprising heating a soft wheat flour at a temperature greater than about 180° F. for a sufficient amount of time to reduce the moisture content of the soft wheat flour to below about 10% by weight.

While not intending to limit the scope of the invention, it is believed that the moisture loss during the heat treating process indicates the amount of treatment the flour has undergone. It is unknown whether the moisture loss by itself is responsible for changes to the flour.

In a further aspect of the invention, there is provided a method of producing a high ratio baking composition comprising the steps of preparing a heat treated soft flour and combining the heat treated soft flour, with a non-flour fiber, a water soluble, heat denaturable protein, and a sugar.

In an additional aspect of the invention, there is provided a high ratio baked product prepared from the high ratio baking composition prepared from the method of the invention.

DETAILED DESCRIPTION OF THE PREFERRED EMBODIMENTS

The invention generally comprises high ratio baking compositions useful for the production of baked goods such as cakes with good volume and handling properties. The high ratio baking composition generally comprises heat treated soft flour, non-flour fiber and a protein source. The high ratio baking composition of the invention has structural, organoleptic and handling characteristics comparable to those high ratio baking compositions utilizing chlorinated flour.

THE COMPOSITION

A. Heat Treated Flour

A principal constituent of the high ratio baking composition is heat treated flour. Flour generally occurs as either soft or hard flour. Soft flour is generally used in high ratio baking compositions. Soft flours are those which function to provide a more moist, more tender product with better organoleptic properties. Concomitantly, the function of the soft flour in a baked good is to provide structural rigidity.

Generally, any soft flour may be used in the invention. Sources of soft flour currently include, but should not be limited to, types of wheat. Importantly, the soft flour of the invention has not, and will not, be treated with chlorine. Preferably, the composition of the invention will comprise a soft wheat flour.

Heat treatment of the soft flour functions to enhance the ability of the soft flour to provide a baked product with improved volume and structural strength. Generally, the heat treatment is performed on the soft flour at a sufficient temperature for a sufficient amount of time to effectively reduce the moisture level in the soft flour to about 5 to 10% by weight. Preferably the moisture level in the soft flour is reduced to about 5 to 9% by weight, more preferably 5 to 7% by weight.

In general, the soft flour is not heated for too long or at too high of a temperature or for too long a time such that the soft flour would begin to scorch, caramelize, turn grey or otherwise decompose. The useful temperature and time ranges vary considerably. However, as a general rule, the higher the treatment temperature the less treatment time required. For example, the soft flour could be treated about 300° F. to 600° F. for about 0.1 to 45 seconds, or treated at about 100° F. to 200° F. for about 1 to 24 hours.

These general guidelines should serve to illustrate but not to limit the invention. It can be appreciated from these guidelines that heat treating the soft flour too much will damage the soft flour, and heating the soft flour too little will not improve the function of the soft flour to the appropriate level.

In one embodiment of the invention, the soft flour is heat treated by heating the soft flour to a temperature greater than about 180° F. for a sufficient amount of time to reduce the moisture content in the soft flour to below about 10%.

Preferably, the heating of the soft flour is performed at a temperature greater than about 220° F. More preferably, the heating is performed at a temperature of about 240° to 250° F.

The heating may be performed at about 240° to 250° F. for about 15 to 60 minutes. Preferably the heating is performed for about 30 to 60 minutes. More preferably the heating is performed for about 50 to 60 minutes.

Significantly, the heating is performed until the moisture content of the soft flour is reduced to about 5 to 10% by weight of the soft flour. During the heat treatment of the soft flour, the soft flour is modified in such a manner that a baked product from this treated flour has improved volume compared to the non-heat treated soft flour. Preferably, the heating is performed until the moisture content of the soft flour is reduced to about 5 to 8% by weight of the soft flour which produces a hygroscopic heat treated soft flour with modified baking properties. More preferably, the heating is performed until the moisture content of the soft flour is reduced to about 5 to 7% by weight of the soft flour.

After the heating is completed, the soft flour may be tempered to replace the moisture in the soft flour. Tempering is a process where the soft flour is spread out in a thin layer in a cabinet with humidity control and the flour absorbs moisture from the humidified air until the flour reaches the equilibrium moisture level.

Preferably, the soft flour is tempered until the moisture level in the soft flour is increased to about 10.5% and more preferably about 11 to 12% by weight of the soft flour. Tempering the soft flour after completion of the heating of the soft flour functions to return the soft flour to about its original moisture level before the heating was performed.

In preparation of the baked good, the addition of too much of the heat treated soft flour generally results in a dry baked good which crumbles easily and has diminished mouthfeel. In contrast, the use of too little heat treated soft flour reduces the structural integrity and volume of a baked good prepared from the high ratio baking composition of the present invention.

Generally, the high ratio baking composition of the present invention comprises about 20 to 45% by weight of the heat treated soft flour. Preferably the high ratio baking composition comprises about 25 to 41% by weight of the heat treated soft flour. More preferably, the high ratio baking composition comprises about 28 to 37% by weight of the soft wheat flour.

B. Fiber

The composition of the invention generally also comprises a non-flour fiber. Fiber includes all food components that are not absorbed during digestion. Within the context of the invention, non-flour fiber means that this fiber component is from a fiber source separate from and in addition to the fiber inherent in the heat treated soft flour. The addition of a non-flour fiber to the high ratio baking composition of the present invention is essential for obtaining baked volume, improved organoleptic properties and uniform cell structure. Generally, fiber resulting from any number of materials may be used including non-flour fiber materials resulting from oats, rice, beans, peas, soybeans, nuts, barley, psyllium, gums, cotton seed, cellulose, sugar beet, fruit, figs, bran flakes, wheat, broccoli, cabbage, green beans, brussels sprouts, radishes, cucumbers, green peppers, prunes, sweet potatoes, corn, cauliflower, apples, lentils, nuts, oranges and bananas, for example. In a preferred embodiment of the invention, the non-flour fiber comprises an oat fiber.

In a typical embodiment of the invention, there is an effective volume controlling amount of a non-flour fiber. Preferably the high ratio baking composition of the present invention comprises about 0.25 to 3% by weight of the non-flour fiber. More preferably, the high ratio baking composition comprises about 0.25 to 1.5% by weight of the non-flour fiber. Most preferably, the high ratio baking composition comprises about 0.75 to 1.25% by weight of the non-flour fiber. Importantly, the addition of too much non-flour fiber into the high ratio baking composition, results in a baked product which is dry and has poor mouthfeel.

C. Protein

In addition to heat treated soft flour and non-flour fiber, the high ratio baking composition of the invention may also comprise a protein source. Within the context of the invention, non-flour protein means that this protein component is from a protein source separate from and in addition to the protein inherent in the heat treated soft flour. Sources of protein include, but are not limited to, vegetables, nuts, cereals, grains, legumes, milk, as well as albumin sources such as eggs, meat, fish, blood, collagen, gelatin and casein. Proteins function to reduce the fragility and enhance the handling properties of a baked good prepared from the high ratio baking composition of the invention.

Preferably, the protein is a water soluble, and is heat denaturable during the baking process. Water soluble proteins are preferred in the high ratio baking compositions of the invention. The continuous liquid phase in a batter formed from the high ratio compositions is water, and therefore, the proteins will be soluble and will become uniformly mixed or dissolved throughout the composition.

If a water soluble non-flour protein is not utilized, the protein may not be soluble in the high ratio baking compositions of the invention. This may result in less uniformity of the compositions.

Heat denaturable proteins polymerize and associate with other constituents during the baking process and are believed to form a gel network in the high ratio baked product. The network functions to provide adhesion or otherwise act as a glue to hold the bake product together. This improves the handling properties.

Generally, any heat denaturable protein is useful in the composition of the invention. Preferably, the water soluble, heat denaturable protein is selected from the group consisting of low temperature processed egg albumen, low temperature processed whey protein and mixtures thereof.

Generally, the protein may be present in the high ratio baking composition of the invention in the form of a water soluble, heat denaturable protein in a concentration ranging from about 0.25 to 6 wt-% by weight of the solids in a batter prepared from the high-ratio baking composition, preferably from about 0.75 to 3 wt-% by weight of the solids in the batter, and most preferably from about 0.75 to 1.5 wt-% by weight of the solids in the batter.

The addition of too much protein may result in a dry, tough baked good. In contrast, the addition of too little protein may result in a baked product which is fragile and has poor handling properties.

D. Sugar

The high ratio baking composition may additionally comprise sugar. The sugar acts as a sweetener and bulking agent providing improved taste and higher moisture mouthfeel in the baking composition. The sugar in the baking composition dissolves quickly upon consumption which provides a moist and tender mouthfeel. A high ratio baking composition is a composition where the weight ratio of the sugar to heat treated soft flour is at least about 1 part sugar to 1 part heat treated soft flour and can be as high as 1.4 parts sugar to 1 part flour. Generally, the high ratio baking composition of the invention comprises sugar and heat treated soft flour wherein the ratio of sugar to heat treated soft flour is at least about 1 to 1. Preferably the ratio of sugar to heat treated soft flour is at least about 1.15 to 1. More preferably the ratio of sugar to heat treated soft flour is at least about 1.3 to 1.

The addition of too much sugar results in an insufficient amount of flour being present in the baking composition. Thus, a baked good prepared from a composition with too much sugar will collapse.

In contrast, too little sugar in the baking composition affords a baked good with poor taste and mouthfeel. The baked good has poor organoleptic properties because there is not enough sweetener in the baking composition. The baked product has a dry mouthfeel because there is an insufficient amount of sugar in the composition to have the tender or moist mouthfeel.

Illustrative examples of the above ratios converted to weight percentages are shown below. The table shows what the upper and lower amounts of sugar that can be present in the high ratio baking composition for each with respect to flour concentration.

TABLE 1

| Wt % Soft Flour | Suggested Lower Limit of Sugar Wt % | Suggested Upper Limit of Sugar Wt % |
| --- | --- | --- |
| 20 | 20 | 28 |
| 30 | 30 | 42 |
| 45 | 45 | 63 |

E. Additional Ingredients

The high ratio baking composition of the invention can optionally comprise a variety of materials to modify any number of organoleptic, nutritional, flavor, color or other properties of a baked good resulting from the high ratio baking composition. In particular, the compositions can additionally include salt, bicarbonates, phosphates, gums, flavorings, starches, colorings, shortening, lecithin, food acids, oils, fats, milk, butter, and water.

F. Method of Preparation

A baked product prepared from the high ratio baking composition can be prepared by several known procedures. In one method, the oven is heated to 350° F. Then two round pans measuring 8 inches in diameter are greased generously with shortening, margarine or butter and then lightly floured or sprayed with no-stick cooking spray. In a separate step, a dry high ratio cake mix of the present invention, is mixed with water, oil and eggs in a large bowl at low speed until moistened. The baking composition is then beat for two minutes at high speed, and poured into the greased and floured pans. The pans containing the batter are then placed in the preheated oven for 25 to 35 minutes. The high ratio cake is done when a toothpick inserted in the center comes out clean or the high ratio cake springs back when lightly touched in the center. The high ratio cake is then removed from the oven and allowed to cool in the pan on a cooling rack for 15 minutes. The high ratio cake can then be removed from the pan.

G. Formulations

The weight percentages throughout the invention including the formulations below are calculated on a dry weight basis and do not include any water in the formulation. The weight percentages of the heat treated flour, non-flour fiber and sugar are calculated from the weight of the solids in the high-ratio baking composition. The weight percent of the non-flour protein is calculated from the weight of the solids in a batter made from the high-ratio baking compositions.

TABLE 2

| | (wt %) | | |
|---|---|---|---|
| | Useful | Working | Preferred |
| Heat Treated Flour | 20 to 45 | 25 to 35 | 25 to 34 |
| Fiber | 0.25 to 3 | 0.25 to 1.5 | 0.75 to 1.25 |
| Protein | 0.25 to 6 | 0.75 to 3 | 0.75 to 1.5 |
| Sugar | 25 to 55 | 30 to 42 | 34 to 40 |

Density

The density of the high ratio baked products prepared from the high ratio baking compositions of the invention are comparable to baked products prepared with chlorinated flour. Preferably, the density of the high ratio baked product is less than about 5.6 to 6.3 g/in$^3$. More preferably, the density of the high ratio baked product is about 5.2 to 5.9 g/in$^3$, most preferably 4.8 to 5.5 g/in$^3$.

WORKING EXAMPLES

The following working examples are provided to further illustrate the invention. However, these examples are not intended to be construed as limiting of the invention.

In the examples below, high ratio baking compositions were prepared using the specified components in each example below. Cakes were then baked utilizing the high ratio baking compositions of the examples. The "control" formulas in the examples below utilized chlorinated flour whereas the experimental formulas of the invention used only heat treated soft flour. Various characteristics of the baked products were then compared including: volume, moisture, fragility, mouthfeel and contour.

Volume Index

This procedure determines the volume indexes on baked cakes and muffins. The procedure is applicable to round, square, rectangular and loaf shaped cakes of different dimensions by proper setting and adjustment of the universal symmetry apparatus used.

A Universal Cake Symmetry Machine, manufactured by The Pillsbury Company Machine Shop, 300-2nd St., S.E., Minneapolis, Minn. 55414 is utilized during the testing procedure.

Procedure

1. Place the empty pan in instrument. Calibrate equipment so that each of the three scales read "0" when the scale feet rest on the bottom of the pan. Be certain that the scale feet and the base of instrument are clean, and that the pans have flat bottoms (not bowed, bent, etc.).

2. The accuracy of the scale reading may then be checked by means of test blocks (or accurate ruler). The scale units are in sixteenths of an inch.

3. From the settings indicated on the table attached, select the proper machine type, and set back slide and both cams of the machine to the proper index markings.

4. Insert the proper Jig into the base pan cut out or use the stop where it is indicated in the table. If the machine model in use does not have a stop, prepare a jig to center the pan.

5. As indicated in the table, insert the proper scale carriage stop adjusters into the scale carriage grooves on both sides.

6. Cook the baked product to be tested as directed.

7. Place the product (in the pan) beneath the scale carriage and against the appropriate jig or stop.

8. Lower the scale carriage until the three scales nest on the product and the scale carriage nests on the stops (or on adjusters when used).

9. Read the value on all three scales. Where the adjusters are used, add 20 to each scale value.

10. Calculate the volume index.

Volume Index = Sum of Scale Values on all 3 Scales

EXAMPLE 1

Yellow Cake Formula

This example shows the volume effect that the heat treatment temperatures has on the high ratio cakes which are treated for sixty minutes.

| | EXAMPLES | | |
|---|---|---|---|
| | 1A | 1B | 1C |
| | Treatment Temp. | | |
| | 200° F. | 225° F. | 245° F. |
| | (grams) | (grams) | (grams) |
| Mix | | | |
| Sugar | 233 | 233 | 233 |
| Flour | 193 | 193 | 193 |
| Shortening | 55 | 55 | 55 |
| Additional Ingredients | 48 | 48 | 48 |
| Add | | | |
| Egg (whole) | 156 | 156 | 156 |
| Oil | 67 | 67 | 67 |
| Water | 224 | 224 | 224 |
| Resulting Product | | | |
| Volume | 79 | 83 | 88 |
| Fragility | fragile | fragile | fragile |
| Contour | flat | flat | slight contour |

EXAMPLE 2

Yellow Cake Formula

This example shows the volume effect that the heat treatment time has on the high ratio cakes which are heat treated at about 245° F.

| | EXAMPLES | | |
|---|---|---|---|
| | 2A | 2B | 2C |
| | Treatment Times | | |
| | 10 min. | 30 min. | 60 min. |
| Mix | | | |
| Sugar | 233 grams | 233 grams | 233 grams |
| Flour | 193 grams | 193 grams | 193 grams |
| Shortening | 55 grams | 55 grams | 55 grams |
| Additional Ingredients | 48 grams | 48 grams | 48 grams |
| Add | | | |
| Egg (whole) | 156 grams | 156 grams | 156 grams |
| Oil | 67 grams | 67 grams | 67 grams |
| Water | 224 grams | 224 grams | 224 grams |
| Resulting Product | | | |
| Volume | 83 | 84 | 88 |
| Fragility | fragile | fragile | fragile |
| Contour | sunken | flat | slight contour |

EXAMPLE 3

Yellow Cake Formula

This example shows the volume effect that varying oat fiber concentration has on the high ratio cakes below. The soft flour was heated at 245° F. for 60 minutes.

| | EXAMPLES | | |
|---|---|---|---|
| | 3A | 3B | 3C |
| | Oat Fiber Concentration | | |
| | 0% (grams) | 1% (grams) | 3% (grams) |
| Mix | | | |
| Sugar | 233 | 231 | 226 |
| Flour | 193 | 191 | 187 |
| Shortening | 55 | 54 | 53 |
| Additional Ingredients | 48 | 48 | 47 |
| Oat Fiber | — | 5.3 | 15.9 |
| Add | | | |
| Egg (whole) | 156 | 156 | 156 |
| Oil | 67 | 67 | 67 |
| Water | 224 | 224 | 224 |
| Resulting Product | | | |
| Volume | 90 | 95 | 99 |
| Fragility | Extremely fragile | Extremely fragile | Extremely fragile |
| Moistness | Moist eating quality | Moist eating quality | Slightly less moist eating quality |

EXAMPLE 4

This example shows the volume effect that varying the protein concentration has on the high ratio cakes. The flour was a heat treated flour for about sixty minutes at about 245° F.

| | EXAMPLES | |
|---|---|---|
| | Protein Concentration | |
| | 0% (grams) | 1% (grams) |
| Mix | | |
| Sugar | 231 | 228 |
| Flour | 191 | 189 |
| Shortening | 54 | 54 |
| Additional Ingredients | 48 | 48 |
| Oat Fiber | 5.3 | 5.3 |
| Egg Albumin (dried) | — | 5.3 |
| Add | | |
| Egg (whole) | 156 | 156 |
| Oil | 67 | 67 |
| Water | 224 | 224 |
| Resulting Product | | |
| Volume | 95 | 92 |
| Fragility | Extremely Fragile | Excellent (equal to cakes made with chlorinated flour). |

WORKING EXAMPLE 5

Yellow Cake Formula

This example shows that a cake product of the invention can be prepared with similar properties to a cake product prepared from a chlorinated flour. A cake product formulated with unchlorinated flour (Example) was prepared and compared to a cake product formulated and prepared with a chlorinated flour product (control). The soft flour in the example was heated at 245° F. for 60 minutes using a twin screw jacketed mixer, pressure rated to 50 p.s.i.g., such as model number CDB 0412FJD, manufactured by Custom Stainless Equipment Company, Santa Rosa, Calif. The fiber used was Better Basic TM 780 White Oak fiber, available from D. D. Williamson & Company, Louisville, Ky.

| | Control (grams) | Example (grams) |
|---|---|---|
| Mix | | |
| Sugars | 233 | 228 |
| Flour | 193 | 189 |
| Shortening | 55 | 54 |
| Additional Ingredients | 48 | 47 |
| Oat fibers | — | 5.3 |
| Egg Albumen (dried) | — | 5.3 |
| Add | | |
| Egg (whole) | 156 | 156 |
| Oil | 67 | 67 |
| Water | 224 | 224 |
| Resulting Volume | 90 index units | 93 index units |
| Contour | excellent | excellent |
| Fragility | excellent | excellent |
| Organoleptic Quality | excellent | excellent |

EXAMPLE 6

White Cake Formula

This example shows that a cake product of the invention can be prepared with similar properties to a cake product prepared from a chlorinated flour. A cake product formulated with unchlorinated flour (Example) was prepared and compared to a cake product formulated and prepared with a chlorinated flour product (control). The soft flour in the example was heated at 245° F. for 60 minutes.

| | Control (grams) | Example (grams) |
|---|---|---|
| Mix | | |
| Sugars | 224 | 232 |
| Flour | 217 | 225 |
| Shortening | 48 | 49 |
| Additional Ingredients | 41 | 42 |
| Oat fibers | — | 5.3 |
| Egg Albumen (dried) | — | 1.3 |
| Add | | |
| Egg (whites) | 99 | 99 |
| Oil | 51 | 51 |
| Water | 290 | 290 |
| Resulting Volume | 85 index units | 87 index units |
| Contour | excellent | excellent |
| Fragility | excellent | excellent |
| Organoleptic Quality | excellent | excellent |

EXAMPLE 7

Chocolate Cake Formula

This example shows that a cake product of the invention can be prepared with similar properties to a cake product prepared from a chlorinated flour. A cake product formulated with unchlorinated flour (Example) was prepared and compared to a cake product formulated and prepared with a chlorinated flour product (control). The soft flour in the example was heated at 245° F. for 60 minutes.

|  | Control (grams) | Example (grams) |
|---|---|---|
| Mix | | |
| Sugars | 200 | 197 |
| Flour | 161 | 158 |
| Shortening | 42 | 41 |
| Additional Ingredients | 119 | 117 |
| Oat fibers | — | 5.2 |
| Egg Albumen (dried) | — | 3.4 |
| Add | | |
| Egg (whites) | 156 | 156 |
| Oil | 101 | 101 |
| Water | 290 | 290 |
| Resulting Volume | 92 index units | 92 index units |
| Contour | excellent | excellent |
| Fragility | excellent | excellent |
| Organoleptic Quality | excellent | excellent |

EXAMPLE 8

Yellow Cake Formula

This example shows that there can be variation in the oil and water content of the compositions of the invention, Examples 8A and 8B without loosing the desired properties. A cake product formulated with a heat treated flour treated at about 245° F. for about 60 minutes was prepared and compared to a cake product formulated and prepared with a chlorinated flour product (control).

|  | Control (grams) | EXAMPLES 8A (grams) | 8B (grams) |
|---|---|---|---|
| Mix | | | |
| Sugar | 233 | 228 | 228 |
| Flour | 193 | 189 | 189 |
| Shortening | 55 | 54 | 54 |
| Additional Ingredients | 48 | 47 | 47 |
| Oat Fiber | — | 5.3 | 5.3 |
| Egg Albumin (dried) | — | 5.3 | 5.3 |
| Add | | | |
| Egg (whole) | 156 | 156 | 156 |
| Oil | 67 | 67 | 80 |
| Water | 224 | 224 | 246 |
| Resulting Volume | 90 | 90 | 87 |
| Eating Quality | Moist | Moist | Extremely Moist |
| Contour | excellent | excellent | excellent |
| Fragility | excellent | excellent | excellent |
| Organoleptic Quality | excellent | excellent | excellent |

While the invention has been specifically described by reference to various embodiments, it will be recognized that various modifications, adaptions and variations, may be made without departing from the spirit and scope of the invention as defined by the following claims.

We claim:

1. A high ratio baking composition comprising:
   (a) about 20 to 45% by weight of a chlorine free heat treated soft flour;
   (b) about 0.25 to 3% by weight of a non-flour fiber;
   (c) about 0.25 to 6% by weight of a protein; and
   (d) about 25 to 55% by weight sugar
   wherein the density of a baked product resulting from the high ratio baking composition is less than about 5.6 to 6.3 g/in$^3$ and the weight ratio of the sugar to the heat treated soft flour is at least about 1:1.

2. The composition of claim 1 wherein said heat treated soft flour is prepared by heating a soft flour to a temperature greater than about 180° F. for a sufficient amount of time to reduce the moisture content in the soft flour to below about 10%.

3. The high ratio baking composition according to claim 2 wherein the soft flour is effectively tempered following the heating to increase the moisture in the soft flour to above about 10.5%.

4. The high ratio baking composition according to claim 1 wherein the soft flour comprises a soft wheat flour.

5. The high ratio baking composition according to claim 1 wherein the non-flour fiber comprises an oat fiber.

6. The high ratio baking composition according to claim 1 wherein the protein comprises a water soluble, heat denaturable protein.

7. The high ratio baking composition according to claim 6 wherein the amount of the water soluble, heat denaturable protein is about 0.25 to 6% by weight of the soft flour and the water soluble, heat denaturable protein is selected from the group consisting of egg albumen, whey and mixtures thereof.

8. A high ratio cake composition comprising:
   (a) a chlorine free heat treated soft flour prepared by heating a soft flour to a temperature greater than about 220° F. for a sufficient amount of time to reduce the moisture level in the soft flour to below about 8%;
   (b) about 0.25 to 3% by weight of a non-flour fiber;
   (c) about 0.75 to 3% by weight of a water soluble, heat denaturable protein; and
   (d) a sugar
   wherein the weight ratio of the sugar to the heat treated soft flour is at least about 1.15 to 1.

9. The high ratio cake composition of claim 8 comprising:
   (a) a chlorine free heat treated soft flour prepared by heating a soft flour to a temperature of about 240° to 250° F. for a sufficient amount of time to reduce the moisture level in the soft flour to about 5.5 to 7%;
   (b) about 0.75 to 1.25% of a non-flour fiber by weight of the soft flour;
   (c) about 0.75 to 1.5% of a water soluble, heat denaturable protein by weight of the soft flour; and
   (d) a sugar
   wherein the weight ratio of the sugar to the heat treated soft flour is at least about 1.3 to 1.

10. The high ratio cake composition according to claim 8 wherein the soft flour is effectively tempered following the heating to increase the moisture in the soft flour to above about 10:5%.

11. The high ratio cake composition according to claim 8 wherein the non-flour fiber comprises an oat fiber.

12. The high ratio cake composition according to claim 8 wherein the water soluble, heat denaturable protein is selected from the group consisting of egg albumen, whey protein, soy protein and mixtures thereof.

13. A baked product resulting from the high ratio baking composition of claim 1.

14. A cake product resulting from the high ratio composition of claim 8.

15. A method of preparing a high ratio baking composition comprising the steps of:

(a) preparing a chlorine free heat treated soft flour; and (b) combining the heat treated soft flour with of a non-flour fiber and of a protein, wherein said high ratio baking composition comprises about 20 to 45% by weight of a chorine free, heat-treated soft-flour, about 0.25 to 3% by weight of a non-flour fiber, and 0.25 to 6% by weight of a protein.

16. The method of claim 15 wherein the heat treated soft flour is prepared by heating a soft flour to a temperature greater than 180° F. for a sufficient amount of time to reduce the moisture content in the flour to below about 10%.

17. The method of claim 15 further comprising the steps of tempering the soft flour following the heating to increase the moisture in the soft flour to above about 10.5% by weight.

18. A method of preparing a high ratio cake composition comprising the steps of:

(a) preparing a chlorine free heat treated soft flour by heating a soft flour to a temperature greater than about 220° F. for a sufficient amount of time to reduce the moisture level in the soft flour to below about 8% and (b) combining:
 (i) the heat treated soft flour;
 (ii) about 0.75 to 3% by weight of a water soluble, heat denaturable, non-flour protein;
 (iii) about 0.25 to 3% by weight of a non-flour fiber; and
 (iv) a sugar wherein the weight ratio of the sugar to the heat treated soft flour is at least about 1.15 to 1.

19. The method of claim 18 further comprising the steps of tempering the soft flour following the heating to increase the moisture in the soft flour to above about 10.5% by weight.

20. The method of preparing a high ratio cake composition according to claim 18 wherein the chlorine free heat treated soft flour is prepared by heating a soft flour to a temperature of about 240° to 250° F. for a sufficient amount of time to reduce the moisture level in the soft flour to about 5.5 to 7%, and the composition comprises: the heat treated soft flour; about 0.75 to 1.25% of a non-flour fiber by weight of the soft flour; about 0.75 to 1.5% of a water soluble, heat denaturable protein by weight of the soft flour; and a sugar wherein the weight ratio of the sugar to the heat treated soft flour is at least about 1.3 to 1.

21. A cake product comprising a high ratio baking composition prepared according to the method of claim 15.

22. A cake product prepared according to the method of claim 18.

23. A method of preparing a high ratio baking composition comprising the steps of:

(a) preparing a chlorine free heat treated soft flour, said step of preparing a chlorine free heat treated soft flour includes:
 (i) heating a soft flour for a sufficient amount of time to reduce the moisture level in the soft flour to not greater than about 10%;
 (ii) tempering the soft flour subsequent to heating until the moisture level is at least about 10.5%; and (b) combining the heat treated soft flour with a non-flour fiber and protein to provide a composition comprising about 0.25 to 3% by weight of a non-flour fiber and about 0.25 to 6% by weight of a protein, and about 20 to 45% by weight of a chlorine free heat treated soft flour.

* * * * *